2 Sheets—Sheet 1.
J. G. STAFFORD.
DUMPING-WAGON.
No. 191,483. Patented May 29, 1877.
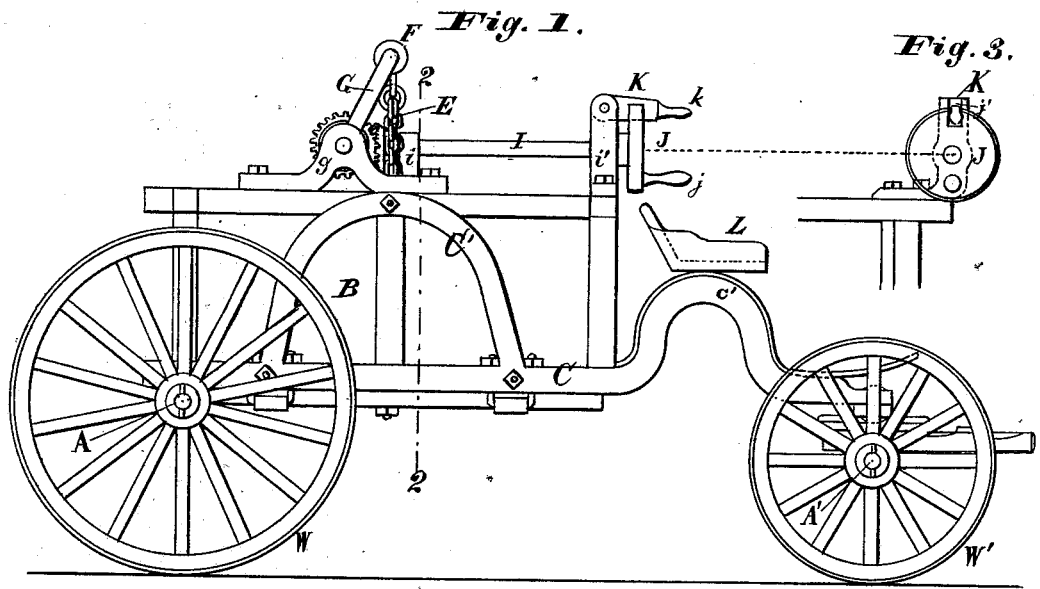
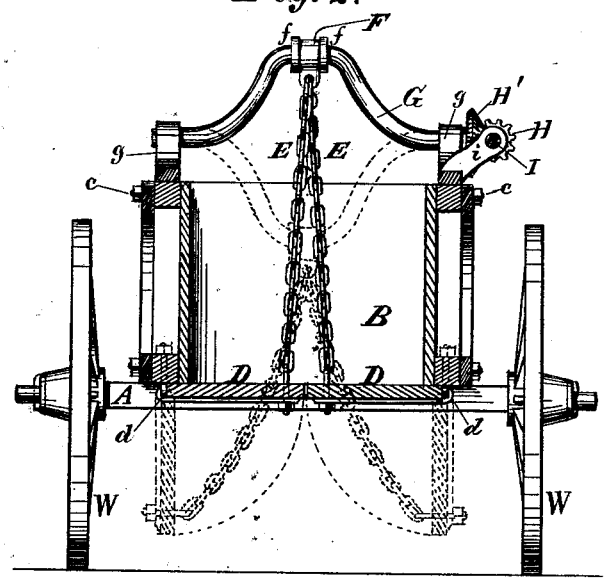
WITNESSES
Chas. J. Gooch
L. Blond Burdett
INVENTOR
John G. Stafford
By Knights, Attorneys 2 Sheets—Sheet 2.

J. G. STAFFORD.
DUMPING-WAGON.

No. 191,483. Patented May 29, 1877.

WITNESSES
Chas J. Gooch
L. Blond Burdett

INVENTOR
John G. Stafford
By Knight Bros Attorneys

N. PETERS, PHOTO-LITHOGRAPHER, WASHINGTON, D. C.

UNITED STATES PATENT OFFICE.

JOHN G. STAFFORD, OF WASHINGTON, DISTRICT OF COLUMBIA.

IMPROVEMENT IN DUMPING-WAGONS.

Specification forming part of Letters Patent No. 191,483, dated May 29, 1877; application filed April 12, 1877.

*To all whom it may concern:*

Be it known that I, JOHN G. STAFFORD, of the city and county of Washington, in the District of Columbia, have invented a certain new and useful Improvement in Dumping-Wagons, of which the following is a specification:

My invention consists in part in constructing a dumping-wagon with a double-hinged bottom, the free sides of the bottom boards meeting at the center, and being sustained by chains from a transverse crank, mounted on top of the bed, which is operated through the medium of bevel-pinions by a longitudinal winch-shaft furnished with a lock or stop to fasten it when the crank is elevated to close the bottom.

The invention further relates to the construction of longitudinal side beams or sills, with upwardly-projecting D-shaped braces to sustain the central part of the bed, and with bows near their forward end which permit the passage of the front wheels in turning the wagon.

Figure 4:
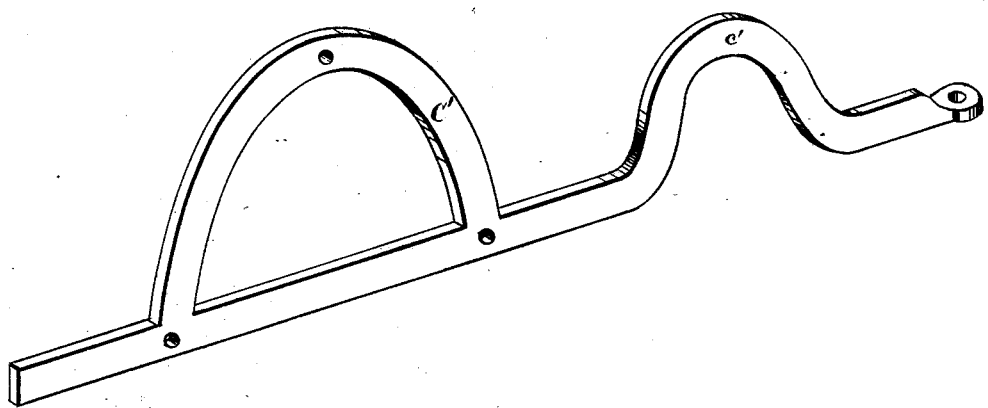
Figure 5:
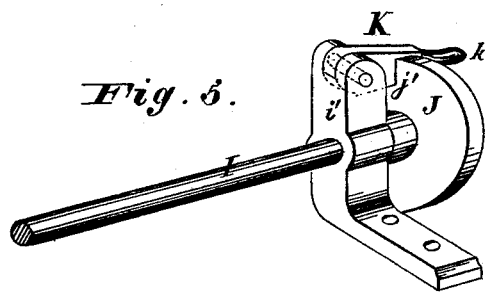
Figure 6:
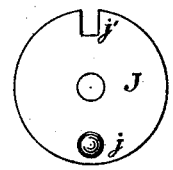

In the accompanying drawings, Figure 1 is a side view of my improved wagon. Fig. 2 is a transverse section of the same on the line 2 2, Fig. 1. Fig. 3 is a front view of the locking winch-beam and its accessories. Fig. 4 is a perspective view of one of the side or sill bars with its D-shaped brace. Fig. 5 is a perspective view of the forward portion of the longitudinal winch-shaft with its forward bearing and lock or stop. Fig. 6 is a front view of the crank-disk by which said shaft is operated and locked.

The rear-axle A, front-axle A', and their supporting-wheels, W W' may be of usual construction, the rear axle being secured rigidly to the bed B, and the front axle attached to the frame by a king-bolt for turning in the usual manner. In order to produce a bed of the necessary strength for sustaining a heavy load without sagging, I provide at each side thereof a side or sill beam, C, of peculiar construction, which is firmly secured to the timbers of the bed by bolts and nuts c. The construction of these side or sill beams is particularly represented in Fig. 4. Their leading peculiarity is the provision of a D-shaped bridge or bracing-piece, C', projecting upward centrally from that portion of the said sill to which the bed is attached. These brace-pieces will thus be understood to afford a very strong, unyielding support to the central portion of the bed, so as to prevent it sagging under any load which it may be required to sustain. The forward ends of the sills are bolted to the front bolster and near their forward ends. They are formed with upwardly-projecting bows c', which admit of the passage of the front wheels for turning short. D D are the bottom-boards hinged at d to the bottom of the bed, so that when permitted to turn they drop into the vertical position illustrated in dotted lines in Fig. 2. They are raised and sustained when the bottom is to be closed for the reception and retention of a load by means of double chains E E, attached at their lower ends to the bottom boards near the inner or meeting edges of the latter, and secured at their upper ends to a sleeve or swivel, F, fitted and turning freely on the crank-shaft G, and prevented from longitudinal motion thereon by collars $f\,f$. The crank-shaft G is mounted in bearings $g$ on the upper longitudinal timbers of the bed, and is applied transversely at the center of the bed, or slightly back of the center, so as to bring the chains E in central position when the crank is elevated as in Fig. 1. The crank is operated through the medium of bevel-pinions H H' by means of a winch-shaft, I, mounted in bearings $i\,i'$, and provided at its forward end with a wheel or disk, J, furnished with a handle, $j$, and formed with a notch, $j'$, to receive a catch or stop, K, which drops into the notch, $j'$, when the crank has drawn up and completely closed the bottom boards, D. The handle $j$ of the winch-shaft I, by means of which the boards D D are turned up to close the bottom for the reception of a load, and the handle $k$ of the lock K, by means of which the said lock K is thrown up to release the bottom boards and admit the load, are both placed within convenient reach of the driver when on his seat L.

Having thus described my invention, the following is what I claim as new therein, and desire to secure by Letters Patent—

1. The combination of the longitudinal winch-shaft I, lock or stop K, bevel-pinions H H', and crank G, for raising the hinged bottom boards, as explained.

2. The transverse crank G, operated by a longitudinal winch-shaft, I, and employed to raise the hinged bottom boards through the medium of double chains E E, as explained.

3. The side or sill beams C, constructed with D-shaped brace or bridge-pieces for sustaining the central part of the boards D, and with bows c' to permit the passage of the front wheels in turning.

JOHN G. STAFFORD.

Witnesses:

OCTAVIUS KNIGHT,
LE BLOND BURDETT.